(12) United States Patent
Stewart

(10) Patent No.: US 6,538,567 B2
(45) Date of Patent: Mar. 25, 2003

(54) MOTORCYCLE JACKET WITH TURN SIGNALS

(76) Inventor: Robin H. Stewart, 15120 Calexico La., Woodbridge, VA (US) 22193

( * ) Notice: Subject to any disclaimer, the term of this patent is extended or adjusted under 35 U.S.C. 154(b) by 0 days.

(21) Appl. No.: 09/933,148

(22) Filed: Aug. 21, 2001

(65) Prior Publication Data

US 2002/0044052 A1 Apr. 18, 2002

Related U.S. Application Data

(60) Provisional application No. 60/247,055, filed on Nov. 13, 2000, and provisional application No. 60/227,080, filed on Aug. 22, 2000.

(51) Int. Cl.[7] ................................................. B60Q 1/34
(52) U.S. Cl. .................... 340/475; 340/984; 340/691.6; 362/103
(58) Field of Search ................................. 340/475, 432, 340/985, 984, 691.4, 691.6, 568.7, 568.3, 571; 362/103, 108

(56) References Cited

U.S. PATENT DOCUMENTS

| 1,209,059 A | | 12/1916 | Smith |
|---|---|---|---|
| 3,153,745 A | | 10/1964 | Gurian et al. |
| 3,851,326 A | * | 11/1974 | Costa ........................ 340/571 |
| 3,864,531 A | * | 2/1975 | Watson ................... 179/121 R |
| 4,559,516 A | | 12/1985 | Schott et al. |
| 4,602,191 A | | 7/1986 | Davila |
| 4,709,307 A | | 11/1987 | Branom |
| 5,113,325 A | | 5/1992 | Eisenbraun |
| 5,207,500 A | | 5/1993 | Rios et al. |
| 5,278,734 A | | 1/1994 | Ferber |
| 5,488,361 A | | 1/1996 | Perry |
| 5,567,040 A | | 10/1996 | Tabanera |
| 5,613,756 A | | 3/1997 | Allen |
| 5,690,411 A | | 11/1997 | Jackman |
| 5,879,076 A | | 3/1999 | Cross |
| 6,027,227 A | | 2/2000 | Tung |
| 6,097,287 A | | 8/2000 | Lu |
| 6,106,130 A | | 8/2000 | Harding |

FOREIGN PATENT DOCUMENTS

| JP | 2265101 | 10/1996 |
|---|---|---|
| WO | WO 88/01360 | 2/1988 |

* cited by examiner

*Primary Examiner*—Anh La
(74) *Attorney, Agent, or Firm*—Lawrence R. Franklin

(57) ABSTRACT

A motorcycle jacket which has turn signal lights attached to the back of the jacket in the upper left and right shoulder areas. The lights are electrically connected to the motorcycle electrical system, so that when the motorcycle turn signals are actuated, the jacket turn signals will flash in synchronism with them.

20 Claims, 4 Drawing Sheets

MOTORCYCLE JACKET WITH TURN SIGNALS

RELATED APPLICATION

This application claims the benefit of U.S. Provisional Application Nos. 60/227,080, filed Aug. 22, 2000 and 60/247,055, filed Nov. 13, 2000, the entire teachings of which are incorporated herein by reference.

BACKGROUND OF THE INVENTION

1. Field of the Invention

This invention relates to a motorcycle jacket with built-in turn signals. The turn signals are connected by an electrical tether to the signalling system of the motorcycle.

2. Description of Related Art

Turn signals on articles of apparel have long been the subject of inventor's endeavors, but to date, none have been particularly satisfactory.

An early attempt is seen in U.S. Pat. No. 1,209,059, issued Dec. 19, 1916, to Smith. A bare bulb, electrically connected to a battery, is attached to the sleeve of a driver, so that when the driver's arm is out of the window making the motions of a turn signal, the light will move with the arm and be visible to other motorists.

Japanese Patent No. JP2265101, issued Oct. 29, 1990 to Hitoshi et al. discloses a jacket with a printed circuit board attached in the middle of its back. A matrix of light emitting diodes (LEDs) are mounted on the printed circuit board which is operationally connected with a motorcycle power source via a programmable operating system. A manipulated graphic with or without text can be displayed on the printed circuit board. The disclosure is very broad with few details, but apparently, when used as a turn signal, a large arrow is formed across the entire board by lighted LEDs, when a turn signal switch is activated by the biker, the arrow pointing in the direction of the turn. While the patentees state that the "turn signal" is activated by a "blinker," it is not clear whether or not the arrow itself flashes on and off. Other displays, such as personal messages, are also programmed into the operating system. The system is expensive, requires separate attachment to the jacket, and the turn signal indication is not the type to which United States drivers are accustomed, opening the possibility that rather than being a clear notification of a turn, it could actually confuse other drivers.

Warning lights, including turn signals, have been placed on motorcycle helmets in U.S. Pat. Nos. 4,559,516, issued Dec. 17, 1985 to Schott et al., 5,207,500, issued May 4, 1993 to Rios et al., and 6,097,287, issued Aug. 1, 2000 to Lu.

The helmet of Schott et al. is self-contained with the battery, switches, circuitry, and lights built-in, a complicated combination, which is expensive to manufacture and which adds to the weight of the helmet. The turn signal switches are inertia switches operable by movements of the cyclist's head, a system prone to accidental actuation, for a motorcyclist's head is constantly moving.

Rios et al. include turn signals, a brake light, a tail light, and a head light in their helmet design, making for a large and heavy combination. All of the lights of Rios et al. are powered and actuated by the motorcycle's electrical system. While a multi-lighted helmet is more easily seen by other motorists than one without lights, the light array disclosed by Rios et al. must present a confusing display. The cyclist's head is constantly rotating, thereby constantly changing the position of the left and right turn lights relative to the bike body, which leaves following drivers to wonder what, if anything, is being indicated.

Lu adds to the conventional helmet only a brake light, inductively coupled to the brake system of the motorcycle. No indications of turns are involved.

Safety lights have also been placed on other wearing apparel, to be worn by policemen, joggers, runners, bicyclists, etc., to warn motorists or others in the vicinity of their presence. See U.S. Pat. Nos. 3,153,745; 5,070,436; 5,488,361; and 5,690,411. Only the last, issued Nov. 25, 1997, to Jackman includes manually actuated "turn signals" incorporated into a jogger's vest. They are powered by batteries carried by the wearer, adding to the garment's weight and complexity.

Many other lighted apparel have been patented, most for decorative or entertainment purposes. See, for example, U.S. Pat. Nos. 4,602,191; 4,709,307; 5,113,325; 5,278,734; and 5,613,756. They are not germaine to the instant invention.

OBJECTS AND SUMMARY OF THE INVENTION

The present invention overcomes the difficulties described above by providing a light-weight motorcycle jacket which is inexpensive to manufacture, reliable in construction, and communicates the cyclist's intentions clearly and unambiguously to other motorists.

It is an object of the invention to accomplish the above by spacing the turn signal lights widely apart at the upper, outer edges of the back and by shaping the indicators as arrowheads pointing in the direction of the turn. The simplicity of the design of the turn signal lights and the widely separated placement thereof are not confusing to other motorists.

It is a further object of the invention to ensure the proper positioning of the lights relative to the motorcycle by placing the turn signal indicators on the back of the jacket. The relative positioning of the lights do not change, for the torso of the biker rarely rotates, remaining square with the direction of travel by being anchored by the rider sitting on the seat while keeping the hands virtually constantly on the handlebar grips.

It is a further object of the invention to power and control the turn signals by electrically connecting the turn signal lights to the electrical system of the motorcycle, thus allowing the jacket lights to function as an auxiliary signalling system in syncronism with the turn signal lamps fixed to the motorcycle. Use of the electrical system of the motorcycle also eliminates from the jacket per se the weight and complexity inherent in batteries, switches, flashers, and other necessary circuitry.

It is a further object of the invention to provide light emitting diodes (LEDs) as the turn signal indicators, since they are shock resistant, reliable, and of sufficient luminous output to be clearly visible to others.

It is a further object of the invention to provide flat, arrow-shaped light sources as the turn signals, with the arrows pointing in the direction of the turn.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which.

DETAILED DESCRIPTION OF THE PREFERRED EMBODIMENT

Figure 1:
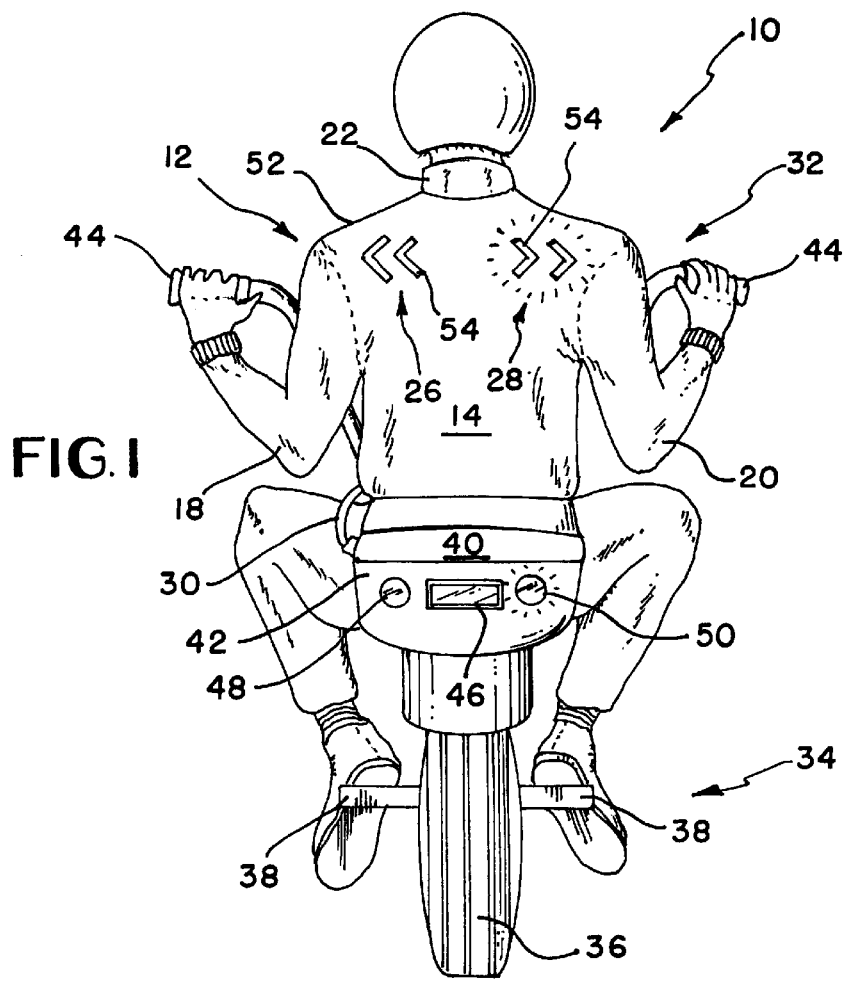
FIG. 1 is a perspective view of the back of a motorcyclist riding on a motorcycle while wearing a preferred embodiment of the present invention, a lighted motorcycle jacket.
Figure 2:
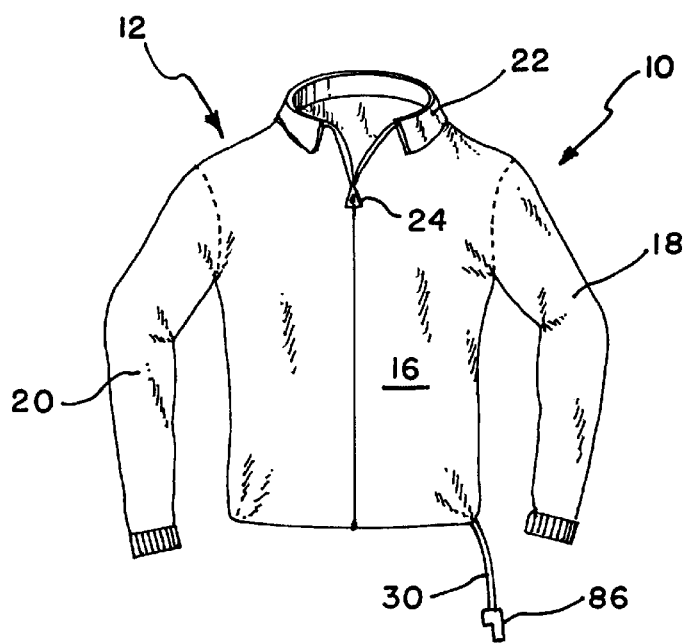
FIG. 2 is a front perspective view of the jacket of FIG. 1.

Referring to FIGS. 1 and 2, apparel 10 is shown as a jacket 12 having a back 14, a front 16, a pair of sleeves 18 and 20, and a collar 22. Zipper 24 completes a traditional motorcycle jacket. The invention is outwardly apparent only by left and right turn signal indicators 26 and 28 and an electrical tether 30. Throughout the specification and claims, the term "jacket" is used in both specific and generic senses, specific to denote the conventional jacket widely known as a "motor-cycle jacket" and generically to denote any article of clothing designed to be worn on the torso of a human being, such as a sweater, vest, shirt, T-shirt, tank-top, strap connected front and back panels, a matrix of belts, and a toga, be them sleeved or sleeveless.

In FIG. 1, a motorcycle rider 32 is riding a motorcycle 34 and signalling for a right turn. Motorcycle 34 can be any well known motorcycle which has been slightly modified to accommodate the invention. Motorcycle 34 comprises a set of wheels 36 (only one of which can be seen), foot rests 38, a seat 40, body 42, handlebars 44, brake light 46, and fixed left and right turn signal lamps 48 and 50. When rider 32 has actuated the right turn signal by means of a switch (not shown) on handlebars 44, right turn signal lamp 50 blinks or flashes, powered by the motorcycle's generator (or battery) and controlled by the motorcycle's flasher circuitry, all of which is conventional and need not be shown.

Back 14 can be visualized as comprising an upper left shoulder area, an upper right shoulder area, and a torso area, which extends below the left and right shoulder areas to the waist of jacket 12. Left and right turn signal indicators 26 and 28 are widely spaced apart on back 14 of jacket 12, optimally positioned in said left and right shoulder areas just below the top of shoulders 52 and just inwardly of sleeves 18 and 20, respectively. This location is the most easily seen by other motorists, especially those driving SUVs, busses, and pick-up trucks, which tend to be seated higher than bikers 32 and can often literally overlook them. The rider's back is naturally rounded in its upper quadrants, so left and right turn signal indicators 26 and 28 are facing slightly upwardly toward higher-situated motorists, making them even more visible. Also, the placement shown is the widest part of the rider's back, thereby spacing them as far apart as is possible under the circumstances for enhanced visibility.

Turn signal indicators 26 and 28 are preferably a plurality of arrowhead-shaped lenses 54, each of which have an LED (FIG. 7) therewithin. As shown, the arrowhead of each lens 54 points either left or right, in the direction of the turn to be indicated. By pointing in their respective directions, left and right turn signal indicators 26 and 28 clearly and unambiguously convey their intended message.

Each lens 54 is preferably made of a strong, impact resistant plastic with an LED housed therewithin, either by being potted therein or by being removably fit, such as by friction fit or by a screw threaded mount. It is contemplated that lenses 54 be transparent or translucent, but it is within the purview of the invention for them to be tinted red or yellow in accordance with conventional practice concerning automotive turn signal lenses.

In one preferred embodiment, each LED is integrally potted within lens 54 as a single unit which is fixedly mounted to jacket 12 by any convenient method, e.g., adhesives, heat sealing, or stitching. Potted LEDs are so reliable that it is likely the jacket will be worn out or discarded long before left and right turn signal indicators 26 and 28 become inoperative, so making them unitary with jacket 12 at manufacture is a viable option. In this embodiment, jacket 12 presents a solid, moisture resistant exterior which is aesthetically pleasing. In addition, there are no loose parts to possibly separate, break, and/or become lost.

Figure 5:
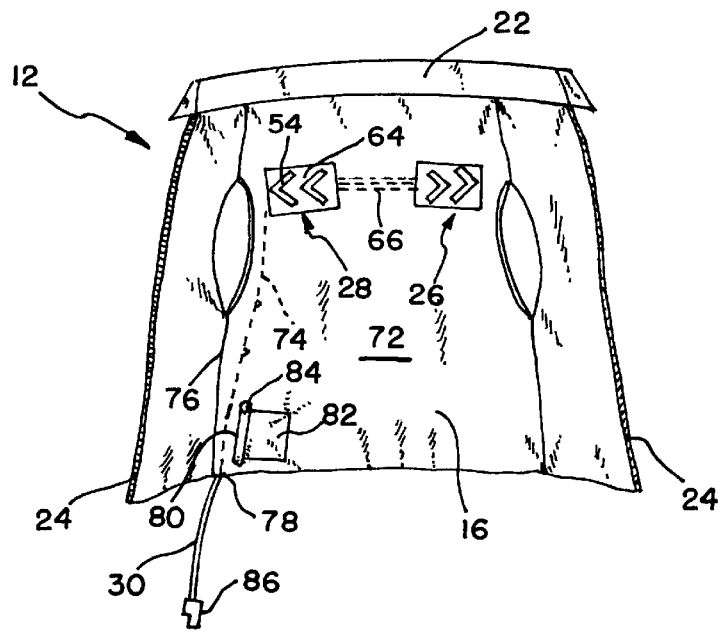
FIG. 5 is a perspective view of the opened front of either of the jackets of FIGS. 1 and 3, respectively.
Figures 7, 8:
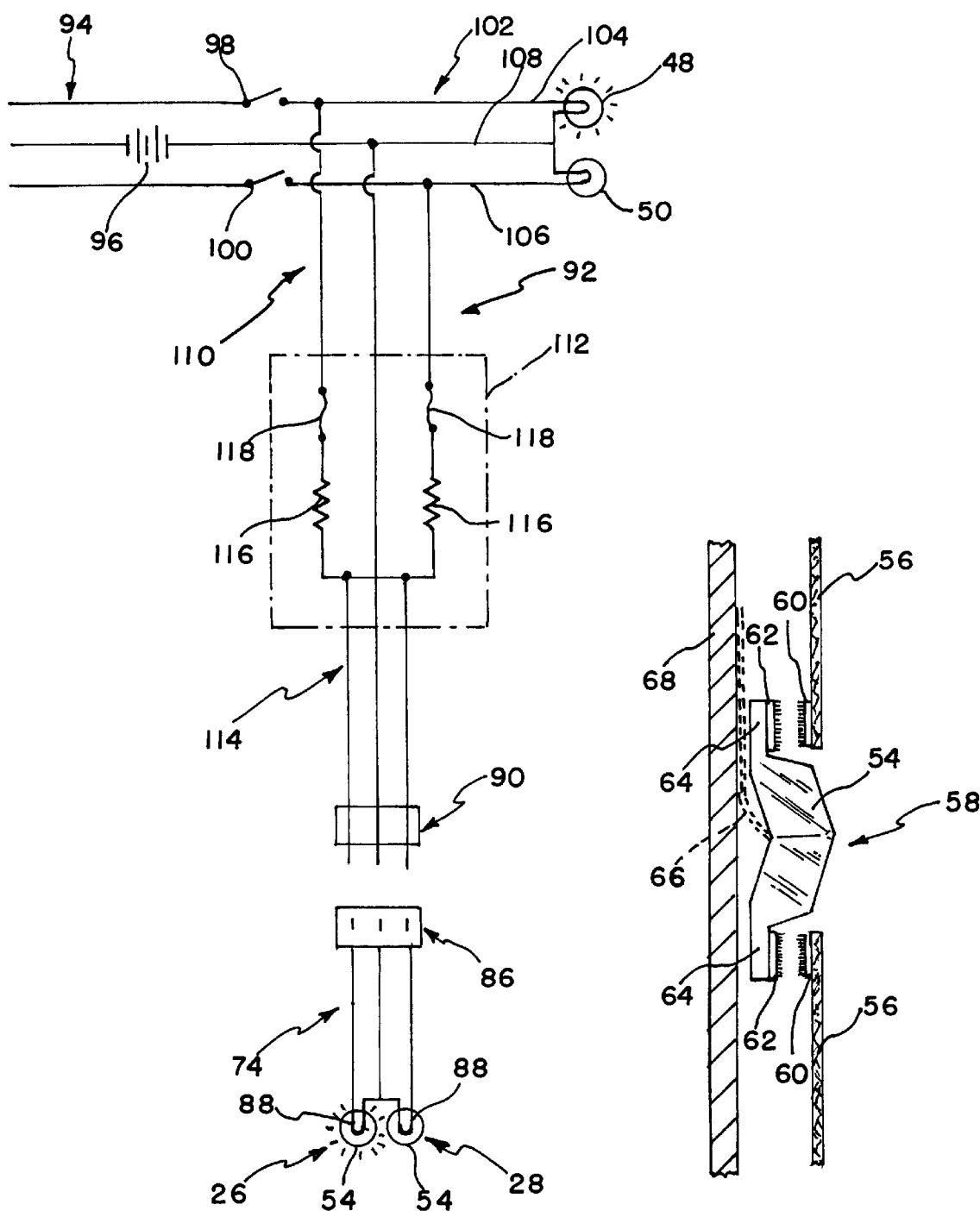
FIG. 7 is a diagrammatic representation of the electrical connections with the motorcycle electrical system.
FIG. 8 is a cross-sectional side view of a segment of a motorcycle jacket of the disclosed invention showing a preferred mode of mounting the turn signal LEDs to the jacket.

A second preferred embodiment is shown in FIGS. 5 and 8, where each lens 54 is capable of being replaced. The exterior material 56, typically leather, of jacket 12 has a plurality of apertures or slits 58 therethrough (FIG. 8). A strip 60 of Velcro™ is secured adjacent slit 58 on the inside surface of material 56. A mating strip 62 of Velcro™ is secured to a peripheral planar flange 64 of lens 54. In practice, each lens 54 is removably attached to the inside of jacket 12 by means of the Velcro™ strips 60 and 62. Should an LED cease to function, the affected lens 54 can be replaced by removing it and subsequently attaching a new lens 54 to electrical wires 66 which are connected to the motorcycle circuitry as will be explained shortly. A liner 68 covers the inside surface of material 56, lenses 54, and wires 66.

Returning to FIG. 1, right turn indicator 28 is shown flashing in synchronism with the flashing of right turn signal lamp 50. If the driver trailing the motorcycle can see only turn indicator 28, turn signal 50 being obscured by a portion of his vehicle or other object, he will be made aware of the biker's intention to turn by the flashing turn indicator on jacket 12, an awareness not afforded without the invention. If the driver trailing the motorcycle can see both, the fact that they are flashing together further emphasizes that it is a turn that is being indicated, and not just decorative lights flashing randomly on and off.

It is preferred that left and right turn signal indicators 26 and 28 be the only lights provided on the back of jacket 12, at least in the upper, outer shoulder areas. Other lights, and even reflective material, can mask or detract from the visibility of left and right turn signal indicators 26 and 28, thereby decreasing their effectiveness as turn signals. Indicia, such as logos, advertising, company or club affiliations, etc., which are printed on back 14 centrally thereof will not usually interfere with the readability of left and right turn signal indicators 26 and 28, and their presence is not excluded by the appended claims. While not preferred, other lighting utilized as a part of jacket 12 should be used with care, balancing their desired decorative value against the enhanced safety function of left and right turn signal indicators 26 and 28.

Tether 30 is electrically connected with the motorcycle electrical system in a manner to be described shortly.

Figure 3:
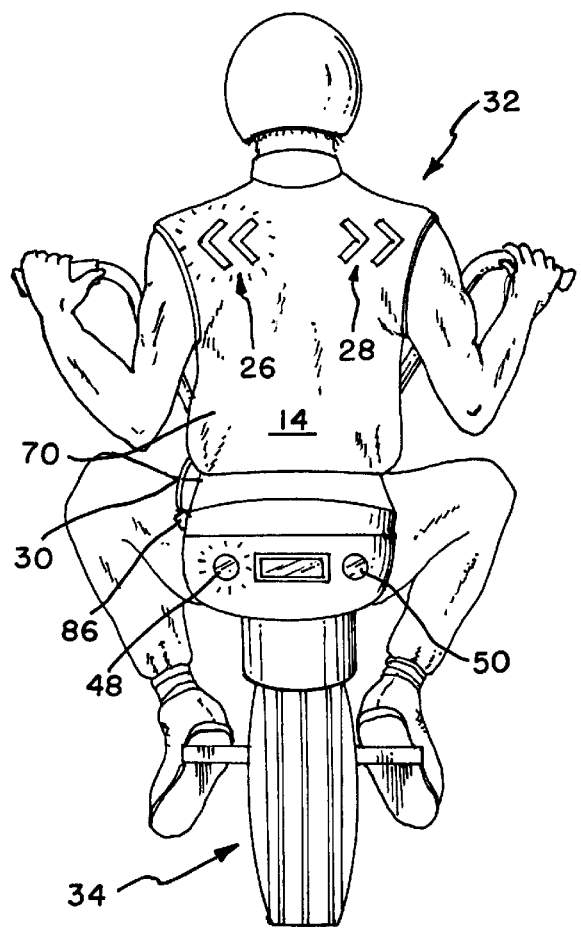
FIG. 3 is a perspective view of the back of a motorcyclist riding on a motorcycle while wearing a second preferred embodiment of the present invention, a sleeveless jacket or vest.
Figure 4:
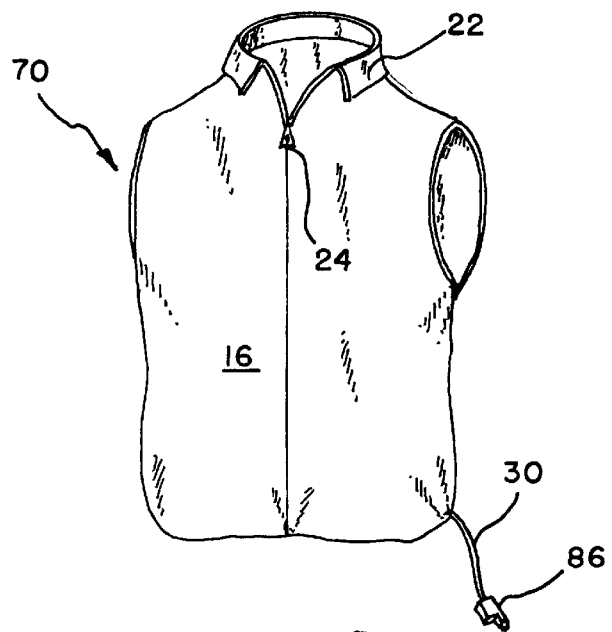
FIG. 4 is a perspective view of the front of the vest of FIG. 3.

A second embodiment of apparel 10 is shown in FIGS. 3 and 4, a sleeveless jacket or vest 70. Common subject matter is denoted by the same reference numerals. Vest 70, indicating a left turn in this showing, is equally effective as jacket 12 in displaying the intention of rider 32, as is readily apparent by a comparison of FIGS. 1–2 with FIGS. 3–4.

An important feature of the invention is the simple and inexpensive construction of the jacket-mounted turn signals. The apparel 10 shown open in FIG. 5 can be either jacket 12 or vest 70, the same principles and construction apply to each. Zipper 24 has been opened, and the two halves of front 16 have been spread apart to show the inside 72 of back 16. Collar 22 is at the top.

Left and right turn signal indicators 26 and 28 are schematically shown with their lenses 54 integral with and flanked by flanges 64. They are connected together by wires 66 and by wires 74 to tether 30. Wires 66 and 74 are enclosed so far as is practicable within seams 76 of jacket 12. It is preferred that apparel 10 be designed such that decorative seams traverse jacket 12 along lines which include the paths of wires 66 and 74. They are thereby protected by the reinforced stitching and are concealed from both view and feel by enclosing them within portions of the jacket which are already relatively bulky. A portion of wires 74 exit at 78 from seam 76 as tether 30. Wires 66 and 74 and tether 30 are preferably reinforced, electrical leads or cables, flat, oval, or circular in cross-section, flexible enough to move within jacket 12 and to provide enough slack to tether 30 to not annoy rider 32, yet strong enough to withstand the elements and abuse a jacket normally receives. Tether 30 exits seam 76 adjacent to or within the mouth 80 of a pocket 82. Pocket 82 is provided in the interior 72 of jacket 12 as a storage place for tether 30. A Velcro™ strip 84 seals pocket 82. When jacket 12 is not being used in its turn signal capacity, tether 30 is stored within pocket 82 where it is completely concealed, in which case jacket 12 has the appearance and feel of a normal motorcycle jacket.

Figure 6:
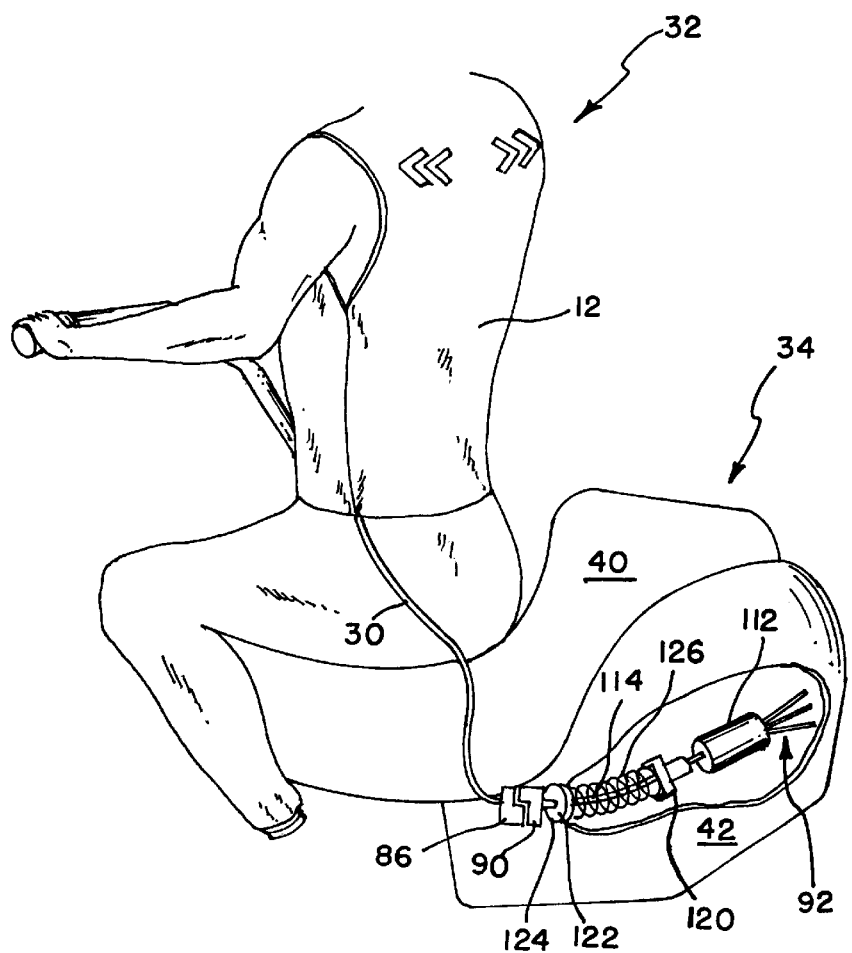
FIG. 6 illustrates the manner in which the the jackets of FIGS. 1 and 3 are operationally connected to the motorcycle.

Referring to FIGS. 6 and 7, the electrical connections between jacket 12 and motorcycle 34 are disclosed.

An electrical connector 86, preferably a female jack, is attached to the free end of tether 30. Wires 74 electrically connect jack 86 to LEDs 88 within lenses 54 (schematically illustrated in FIG. 7). Another electrical connector 90, a male plug, electrically connects jacket 12 to the electrical system 92 of motorcycle 34. Female jack 86 and male plug 90 are complementarily keyed, as indicated in FIG. 6, so they can be connected in only one orientation, thus guaranteeing left turn signal indicator 26 and left turn lamp 48 are ganged to flash together, and simultaneously, right turn signal indicator 28 and right turn lamp 50 are also ganged to flash together.

FIG. 7 shows a schematic of a conventional motorcycle electrical system 92 comprising a three-conductor cable 94 connecting a flasher and a generator (not shown) to a battery 96 and to left and right turn signal switches 98 and 100. Three-conductor cable 102 connects left and right turn signal switches 98 and 100 to left and right turn signal lamps 48 and 50. Three-conductor cables 94 and 102 are typical of the three-conductor electrical lines disclosed herein, all of which include hot wires 104 and 106 and a ground wire 108. Three-conductor cables are shown for illustrative purposes only. Any equivalent electrical wiring which flexibly, reliably connects LEDs 88 to jack 86 can be substituted.

In order to connect jacket 12 to motorcycle electrical system 92, a three-conductor cable 110 is spliced into cable 102 and is electrically connected with a transformer 112 for adjusting the motorcycle voltage and amperage to the appropriate levels for LED usage. Another three-conductor cable 114 connects transformer 112 to male plug 90.

Associated with transformer 112 are selected resistors 116, preferably variable resistors, to fine tune the line values so that LEDs 88 flash with the same luminosity as left and right turn signal lamps 48 and 50. This further reinforces the conviction in the minds of other motorists that left and right turn signal indicators 26 and 28 are indeed turn signals. Fuses 118 are provided to protect the circuitry within jacket 12, and thereby the wearer thereof.

Shown schematically in FIG. 6, transformer 112 is mounted on the inside wall of motorcycle body 42 by a bracket 120. Three-conductor cable 114 protrudes through a rubber grommet 122 fixed in an aperture 124 through the shell of body 42. The length of cable 114 between bracket 120 and grommet 122 is greater than the linear distance therebetween. A coiled spring 126 biases cable 114 inwardly, tensioning plug 90 against grommet 122. Of course, tether 30 is long enough to hang loosely between jacket 12 and plug 90, so that the movements of rider 32 are unincumbered. Should rider 32 forget to unplug jack 86 from plug 90 prior to attempting to dismount motorcycle 34, spring 126 will provide a gentle pull at a controlled resistance, allowing plug 90 and a segment of line 114 to be extended away from body 42 without damage to either. The tugging of spring 126 acts as a reminder to rider 32 to unplug himself from motorcycle 34.

The advantages of the invention should now be clear.

The modifications in design of new motorcycle jackets is minimal, requiring only the additions of turn signal indicators 26 and 28, wires 66 and 74, jack 86, and pocket 82. Existing motorcycle jackets can easily be retrofitted by the addition of the same components. Both are exceedingly inexpensive.

The inventive turn signal jacket is virtually indistinguishable from conventional jackets in appearance and weight. Each turn signal indicator 26 and 28 is very light, weighing but a few ounces. Wires 66 and 74, jack 86, and pocket 82 are also very light. The difference in weight is negligible. When tether 30 is stored in pocket 82, the sole difference in appearance are the chevron-shaped turn signal indicators 26 and 28, which have the simplicity of elegant styling.

The modifications to motorcycle 34 necessary to coact with jacket 12 are also minor and inexpensive, both to include in future motorcycle designs or as retrofits to existing bikes. Splicing wires 110, transformer 112, coiled spring 126, bracket 120, grommet 122, cable 114, and plug 90 comprise the extent of materials added.

The greatest benefit is in the safety afforded by the functioning of jacket 12. Turn signal indicators 26 and 28 are located high on the rider's body on a surface which is almost always square with the line of travel, thereby being essentially parallel with the motorcycle's fixed turn signal lamps 48 and 50. They are spaced widely apart, usually more so than the fixed turn signal lamps on motorcycles, which enhances their visibility and the clarity of their messages. Turn signal indicators 26 and 28 do not compete with other lights or distractions, so their messages are clear and instantly recognizable.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

I claim as my invention:

1. An article of clothing adapted to be worn on the torso of a human being, said article of clothing comprising:
   a front and a back;
   said back having an upper left shoulder area and an upper right shoulder area, said left and right shoulder areas being located just below the shoulders and just inward of the arm-holes of said article of clothing;
   a left turn signal attached to said back in said upper left shoulder area and a right turn signal attached to said back in said upper right shoulder area, said left and right turn signals respectively providing an indication of the direction of turn when actuated;
   each of said turn signals comprising a light source;
   electrical leads connecting said light sources to an electrical connector, said electrical connector being adapted to be electrically connected to a vehicle's turn signalling system; and
   a portion of said electrical leads extending away from said article of clothing, said portion terminating in said electrical connector.

2. The article of clothing of claim 1 wherein said vehicle is a motorcycle.

3. The article of clothing of claim 1 wherein said article of clothing is a jacket and wherein each of said turn signals further comprise a lens, said light source being housed within said lens.

4. The article of clothing of claim 3 wherein said light source comprises an LED.

5. The article of clothing of claim 3 wherein said light source is potted within said lens.

6. The article of clothing of claim 3 wherein said light source is removably mounted within said lens.

7. The article of clothing of claim 3 wherein said lens is removably attached to said jacket.

8. The article of clothing of claim 3 wherein said lens is unitarily attached to said jacket.

9. The article of clothing of claim 3 wherein each of said lenses is relatively flat and shaped like an arrowhead with each of said arrowheads pointed in its respective turn-indicating direction.

10. The article of clothing of claim 2 wherein said article of clothing is a motorcycle jacket.

11. The article of clothing of claim 2 wherein said article of clothing is a vest.

12. The article of clothing of claim 1 wherein at least part of said electrical leads is sewn into the seams of said article of clothing.

13. The article of clothing of claim 1 wherein said portion of said electrical leads extending away from said article of clothing comprises a tether, said tether further comprising said electrical connector electrically attached to said electrical leads at the free end of said tether.

14. The article of clothing of claim 13 wherein said article of clothing has an interior and said interior includes a pocket adapted for storing said tether.

15. In combination, a jacket with turn signals and a motorcycle, said combination comprising:
   said jacket comprising:
      a back including a left shoulder area and a right shoulder area
      a jacket left turn signal attached to said back in said left shoulder area and a jacket right turn signal attached to said back in said right shoulder area;
      each of said jacket turn signals comprising an electrical light source;
      electrical leads connecting said light sources to an electrical connector; and
      a portion of said electrical leads extending away from said jacket, said portion terminating in said electrical connector;
   said motorcycle comprising:
      a body;
      motorcycle left and right turn signal lamps fixedly mounted on said body;
      a motorcycle electrical system operationally connecting a flasher circuit to said motorcycle left and right turn signal lamps when actuated by left and right turn signal switches, respectively;
      a connector circuit tapped into said motorcycle electrical system, said connector circuit including an output connector; and
      said jacket electrical connector electrically connecting with said motorcycle output connector such that said jacket left and right turn signals respectively flash in synchronism with said motorcycle left and right turn signal lamps when respectively actuated by said left and right turn signal switches.

16. The combination of claim 15 wherein at least part of said electrical leads is sewn into the seams of said jacket.

17. The combination of claim 15 wherein said connector circuit includes a transformer circuit.

18. The combination of claim 17 wherein said connector circuit further includes a spring-biased cable connecting said transformer circuit with said output connector.

19. The combination of claim 16 wherein said portion of said jacket electrical leads which extends away from said jacket comprises a tether, and said electrical connector being electrically attached to said electrical leads at the free end of said tether.

20. The combination of claim 19 wherein said jacket has an interior and said interior includes a pocket adapted for storing said tether.

* * * * *